United States Patent [19]

Simpson et al.

[11] Patent Number: 4,879,265

[45] Date of Patent: Nov. 7, 1989

[54] HYDROPROCESSING CATALYST AND PHOSPHOROUS AND CITRIC ACID CONTAINING IMPREGNATING SOLUTION

[75] Inventors: Howard D. Simpson, Irvine; Pauline B. Borgens, Diamond Bar, both of Calif.

[73] Assignee: Union Oil Company of California, Los Angeles, Calif.

[21] Appl. No.: 192,379

[22] Filed: May 10, 1988

Related U.S. Application Data

[60] Continuation-in-part of Ser. No. 825,058, Jan. 31, 1986, Pat. No. 4,743,359, which is a division of Ser. No. 595,260, Mar. 30, 1984, Pat. No. 4,568,450, which is a division of Ser. No. 409,583, Aug. 19, 1982, Pat. No. 4,455,390.

[51] Int. Cl.$^4$ .................. B01J 27/19; B01J 27/185; B01J 21/04; C10G 45/08
[52] U.S. Cl. .................. 502/211; 208/216 R; 208/251 H; 208/254 H; 502/210; 502/314
[58] Field of Search ............. 502/170, 155, 211, 210, 502/314

[56] References Cited

U.S. PATENT DOCUMENTS

| | | | |
|---|---|---|---|
| 3,232,887 | 2/1966 | Pessimisis | 502/211 |
| 3,840,472 | 10/1974 | Colgan et al. | 502/211 |
| 4,107,087 | 8/1978 | Pessimisis | 502/215 |
| 4,455,390 | 6/1984 | Ting et al. | 502/314 |
| 4,483,942 | 11/1984 | Sekido et al. | 502/314 |
| 4,568,450 | 2/1986 | Ting et al. | 208/216 R |
| 4,743,359 | 5/1988 | Ting et al. | 208/134 |

*Primary Examiner*—Paul E. Konopka
*Attorney, Agent, or Firm*—Alan H. Thompson; Gregory F. Wirzbicki

[57] ABSTRACT

A hydrocarbon hydroprocessing catalyst containing a Group VIB metal and a phosphorus component on a porous refractory oxide is prepared by impregnating support particles with a solution containing (1) phosphorus, and (2) citric acid in a mole ratio to Group VIB metal components of less than 1 to 1, followed by drying and calcining. The catalyst is useful for promoting a number of hydrocarbon hydroprocessing reactions, particularly those involving hydrogenative desulfurization, demetallization and most particularly, denitrogenation.

44 Claims, No Drawings

HYDROPROCESSING CATALYST AND PHOSPHOROUS AND CITRIC ACID CONTAINING IMPREGNATING SOLUTION

RELATED APPLICATIONS

This application is a continuation-in-part application of application U.S. Ser. No. 825,058, filed Jan. 31, 1986, now U.S. Pat. No. 4,743,359, which is a divisional application of application U.S. Ser. No. 595,260, filed Mar. 30, 1984, now U.S. Pat. 4,568,450, which is a divisional application U.S. Ser. No. 409,583, filed on Aug. 9, 1982, now U.S. Pat. No. 4,455,390.

BACKGROUND OF TJHE INVENTION

1. Field of the Invention

This invention relates to hydrocarbon hydroprocessing catalysts, such as those utilized to catalyze the reaction of hydrogen with organo-sulfur, organo-metallic and particularly organo-nitrogen compounds. More particularly this invention is directed to a catalyst useful for the hydrodesulfurization of hydrocarbons, such as gas oils and residuum, and to a method for preparing such catalysts employing a novel aqueous impregnating solution. The invention is especially directed to catalysts of high overall denitrogenation activity and stability.

2. Description of the Prior Art

In the refining of hydrocarbons, it is often necessary to convert a hydrocarbon oil fraction to different forms. Typically, particulate catalysts are utilized to promote desulfurization, denitrogenation or demetallization reactions when feedstocks such as gas oils or residuum are contacted with catalysts under conditions of elevated temperature and pressure and in the presence of hydrogen so that the sulfur components are converted to hydrogen sulfide, the nitrogen components to ammonia and the metals are deposited on the catalyst.

Hydroprocessing of hydrocarbon oils may be carried out with a catalyst containing Group VIB and Group VIII metals and phosphorus on a refractory oxide support. Compositions containing these and other elements have been previously investigated. For example, catalysts comprising a Group VIB metal, particularly molybdenum or tungsten, a Group VIII metal, particularly cobalt or nickel, and phosphorus on an alumina base have been disclosed in U.S. Pat. Nos. 3,755,196, 3,840,472 and 4,686,030. Such catalysts are very often prepared by impregnation, that is, the deposition of the active components on the support base by contact thereof with an aqueous solution containing the active components in dissolved form. U.S. Pat. No. 3,755,196, for example, describes impregnating media and methods for preparing catalysts using stabilized impregnating solutions consisting of molybdenum plus nickel or cobalt salts with phosphoric acid dissolved in an aqueous medium. U.S. Pat. No. 3,840,472 discloses another process for preparing a stable impregnating solution that includes dissolving a nickel or cobalt compound with an acid of phosphorus followed by subsequent dissolution of molybdenum oxide. U.S. Pat. No. 4,686,030 describes an impregnating solution containing dissolved Group VIII metals and dissolved molybdenum that is prepared by solubilizing molybdenum with either phosphoric acid, ammonium hydroxide or citric acid alone.

Although conventional catalysts are active and stable for hydrocarbon hydroprocessing reactions, catalysts of yet higher activities and stabilities are still being sought. Increasing the activity of a catalyst increases the rate at which a chemical reaction proceeds under given conditions, and increasing the stability of a catalyst increases its resistance to deactivation, that is, the useful life of the catalyst is extended. In general, as the activity of a catalyst is increased, the conditions required to produce a given end product, such as a hydrocarbon of given sulfur, nitrogen, and/or contaminant metals content, become more mild Milder conditions require less energy to achieve the desired product, and catalyst life is extended due to such factors as lower coke formation or the deposition of less metals.

SUMMARY OF THE INVENTION

Briefly, the invention provides for a catalyst useful for hydroprocessing hydrocarbon oils and for a method for preparing such a catalyst employing a novel impregnating solution. In one embodiment, an aqueous impregnating solution is prepared containing at least one dissolved Group VIB metal component, at least one dissolved phosphorus component and citric acid, the mole ratio of the citric acid to the Group VIB metal component being less than 1 to 1. A catalyst composition comprising a Group VIB metal component and a phosphorus component on a refractory oxide is prepared by impregnating support particles with this solution, followed by calcination. In a preferred embodiment, a hydroprocessing catalyst is prepared by the method of impregnating alumina-containing support particles with a stable aqueous impregnating solution having a pH less than 1 and comprising a dissolved molybdenum component, a dissolved nickel or cobalt component, an acidic compound of phosphorus and citric acid, followed by calcination. In this embodiment the solution contains (1) molybdenum components (as $MoO_3$) in a total concentration greater than about 10 weight percent (2) phosphorus components (as P) in a total concentration greater than about one weight percent and (3) citric acid components (as the monohydrate) in a mole ratio to the molybdenum components (as $MoO_3$) in the range between 0.05 to 1 and 0.9 to 1.

Catalysts prepared in accordance with the invention are useful for promoting the hydroprocessing of hydrocarbon oils, particularly by hydronitrogenation. A catalyst prepared with the impregnating solution described above exhibits high activity and stability when utilized to promote high conversions of organo-nitrogen compounds, particularly those found in hydrocarbon gas oils, to ammonia.

DETAILED DESCRIPTION OF THE INVENTION

Hydrocarbon hydroprocessing catalysts of the present invention are prepared with impregnating solutions having relatively low pH values and containing a Group VIB metal component, a phosphorus component and citric acid, with the mole ratio of the citric acid to the Group VIB metal trioxide being less than 1 to 1. The solutions contain dissolved phosphorus components, usually in a concentration greater than 0.5 weight percent, citric acid and Group VIB metal components, with the preferred Group VIB metals being molybdenum and tungsten, with molybdenum being most preferred. Preferably, the solution contains one or more Group VIB metal components in a total concentration of at least 3 weight percent, calculated as the metal trioxides, and more preferably in the range from about 5 to about 50 weight percent. The mole ratio of the citric acid to the Group VIB metal components (as the trioxide) in the solution is preferably in the range between about 0.05 to 1 and about 0.9 to 1, and most preferably between about 0.1 to 1 and about 0.5 to 1. The solutions may also contain Group XVIII metal components, especially cobalt or nickel, usually in a total concentration of at least 0.05 weight percent and usually from about 1 to about 10 weight percent, calculated as the monoxide.

The presence of phosphorus in combination with citric acid in the impregnating solution utilized to prepare the final catalyst of this invention is required. Citric acid and phosphorus components are used to increase the activity of the finished hydroprocessing catalyst prepared from the impregnating solution when citric acid is added in such an amount that the mole ratio to the Group VIB metal component is less than 1 to 1. Citric acid may be added to the solution in liquid or solid form. A preferred compound is citric acid monohydrate, although any suitable form of citric acid or its precursor may be utilized. As demonstrated in the examples hereafter, a catalyst of the invention prepared with the impregnating solution containing phosphorus and having a mole ratio of citric acid to a Group VIB metal trioxide ($MoO_3$) of less than 0.9 to 1 is more active when utilized to promote denitrogenation reactions in hydrocarbon oils than is essentially the same catalyst except prepared from an impregnating solution containing no citric acid. The citric acid/Group VIB metal trioxide mole ratio less than 0.5 to 1 is highly preferred.

The impregnating solution of the invention may be most conveniently prepared by dissolving into water a Group VIB metal compound, a compound containing phosphorus, citric acid, and optionally, a Group VIII metal component. The resulting solution has a pH preferably less than about 4.0, more preferably less than about 1.0, and most preferably from about 0 to less than 1.0. Generally either the citric acid, phosphorus-containing compound or Group VIB metal compound is first dissolved in the aqueous medium under conditions which will effect dissolution and provide the specified concentrations of components. At atmospheric pressure, any temperature in the range of about 35° F. to about 210° F. may be employed, but it is generally preferred to use a temperature of about 75° F. to about 150° F. Preferably, the Group VIB metal component is first dissolved in water to form a slurry wherein at least about one milliliter of water is utilized per gram of the compound containing the Group VIB metal component. Typically, the phosphorus-containing compound is an acid of phosphorus, such as the ortho-phosphoric acid ($H_3PO_4$) or a phosphoric acid precursor, that is added to the aqueous slurry or solution in an amount that effects dissolution of the phosphorus-containing compound and the compound containing the Group VIB metal component. The amount of phosphorus-containing compound (calculated as P) needed to effect dissolution of the Group VIB metal component is usually at least 10 percent of the weight of the Group VIB metal component (calculated as the trioxide), found in the finished hydroprocessing catalyst prepared from the impregnating solution.

It is also preferred that the citric acid be added to the solution after dissolution of at least a portion of the Group VIB metal component, especially when an impregnating solution is desired that contains a relatively large proportion of Group VIB metal components, typically in a total concentration greater than about 10 weight percent, and particularly when greater than about 17 weight percent. In addition to lowering the pH of an aqueous solution, it is believed the presence of citric acid in the impregnating solution improves the dispersion of a given amount of Group VIB metal component on the surface area of the support particles and, more importantly, allows reduction of the total amount of phosphorus components which are required to be dissolved in the impregnating solution to effect Group VIB metal component dissolution.

A variety of Group VIB metal components may be utilized to produce a stable impregnating solution of the invention. In general, all Group VIB metal compounds soluble in aqueous media, particularly those of molybdenum or tungsten, may be utilized. The oxides of molybdenum (e.g., molybdenum trioxide) are preferred, as are many salts containing molybdenum, particularly precursors of molybdenum trioxide. Also useful are salts containing both a Group VIB metal and ammonium ion, such as ammonium dimolybdate, and most preferably ammonium heptamolybdate.

After dissolution of the Group VIB metal, phosphorus-containing compound and citric acid, a Group VIII metal component is then preferably added to the impregnating solution. Suitable Group VIII metal compounds are watersoluble, and usually include an oxide, carbonate, and preferably a nitrate of cobalt, nickel, and iron, or combinations thereof. The nitrates of cobalt and nickel are preferred, with nickel nitrate most preferred. Preferably, the final solution contains Group VIII components (as the monoxide) in a total concentration between about 1 and 10 weight percent and more preferably less than 6 weight percent.

After addition of a Group VIII compound, the pH of the solution may drop below about 1.0, but if the solution remains above about 1.2, more acid is usually added to lower the pH preferably below about 1.2, and more preferably below about 1.0, and most preferably below about 0.8. The acid used to lower the pH may be any acid containing thermally decomposable anions or anions not resulting in undesirable compounds in the final catalyst. Citric acid or phosphoric acid is, of course, preferred, but others such as dilute nitric acid, dilute sulfuric acid, dilute hydrochloric acid, depending upon the final catalyst composition desired, may be suitable to lower the pH.

Since the dissolved phosphorus-containing compound is usually strongly acidic (i.e., phosphoric acid), the presence of relatively large amounts thereof in the impregnating solution may cause an undesirable reduction in the pH of the solution that results in physical or chemical degradation of the support particles utilized in the preparation of the catalyst. Physical degradation of the support particles may result in a decrease in surface area available for deposition of the Group VIB metal components from the impregnating solution and/or the formation of excessive aluminum phosphate ($AlPO_4$) when the support particles contain aluminum. Excessive phosphorus (i.e., phosphoric acid) may also cause chemical degradation wherein an undesirable amount of Group VIII metal aluminate (such as $NiAlO_4$) may form during calcination due to undesirable or excessive peptizing of the support (i.e., interaction with excess hydroxyl groups on the support surface) thus causing destruction of the preferred oxide form of the Group VIII metal component after calcination. Accordingly, the phosphorus content in the impregnating solution must be controlled by addition of citric acid in the amounts disclosed herein.

One unusual feature of the invention is that the impregnating solution is stable even when containing a relatively large proportion of Group VIB metal components, i.e., in a total concentration greater than about 10 weight percent and preferably greater than 17 weight percent. Essentially no crystalline deposits or crystalline aggregations are detected in the impregnating solution of the invention that result in a lessening in catalytic activity in the final catalyst.

Several conventional methods may be employed to impregnate the catalytic support particles with the solution of this invention. One such method, commonly referred to as the spray impregnation technique, involves spraying the support with the impregnating solution. Another impregnating method, often used to maintain relatively low concentrations of active components in the solution, is the circulation or multi-dip procedure wherein the active support is repeatedly contacted with the impregnating solution with or without intermittent drying. In order to take advantage of the dispersion property of the citric acid in the combination with the phosphorus-containing compound and also the stability of the solution of the invention (especially when relatively high concentrations of Group VIB metals are desired), other methods involving soaking the support in a large volume of the impregnating solution or circulating the support therein are preferred, as for example, the pore volume or pore saturation technique, the continuous solution impregnation (CSI) technique and the like. The pore saturation method involves dipping the catalyst support into an impregnating solution having a volume usually sufficient to fill the pores of the support and, on occasion, may be up to about 10 percent excess. The concentrations of active components in the solution during impregnation by this technique may be somewhat higher than those utilized in other methods because the ratios of active components in the final catalyst are determined directly by solution composition.

The impregnating solution of the invention may be utilized to incorporate the catalytically active components with any of a number of porous refractory support particles. Support particles suitable for use herein include such porous amorphous refractory oxides as silica, magnesia, silica-magnesia, zirconia, silica-zirconia, titania, silica-titania, alumina, silica-alumina, etc. with supports containing gamma, theta, delta and/or eta alumina being highly preferred Gamma alumina is the most highly preferred support. Other suitable porous refractory supports include natural and synthetic crystalline and amorphous alumino silicates and crystalline silicas, e.g., silicalite. Preferred support particles having the preferred physical characteristics disclosed herein are commercially available from Nippon-Ketjen Catalyst Division of AKZO-Chemie, and American Cyanamid, Inc. Mixtures of the foregoing oxides are also contemplated, especially when prepared as homogeneously as possible.

The porous refractory oxide support material is usually prepared in the form of shaped particulates, with the preferred method being to extrude a precursor of the desired support through a die having openings therein of desired size and shape, after which the extruded matter is cut into extrudates of desired length. The support particles may also be prepared by mulling (or pulverizing) a precalcined porous refractory oxide to a particle size less than about 100 microns and extruding the material.

The support particles prepared in the form of gel extrudates are generally pre-calcined prior to impregnation, especially if gamma alumina is the desired support material. Temperatures above about 900° F. are required to convert the alumina gel to gamma alumina. Usually, temperatures above about 1,100° F. are utilized to effect this transformation, with holding periods of one-half to three hours generally being utilized to produce preferred gamma alumina extrudates.

The extruded particles may have any cross-sectional shape, i.e., symmetrical or asymmetrical, but most often have a symmetrical cross-sectional shape, preferably a cylindrical or polylobal shape. The cross-sectional diameter of the particles is usually about 1/40 to about 1/8 inch, preferably about 1/32 to about 1/12 inch, and most preferably about 1/24 to about 1/15 inch. Among the preferred catalyst configurations are cross-sectional shapes resembling that of a three-leaf clover, as shown, for example, in FIGS. 8 and 8A of U.S. Pat. No. 4,028,227. Preferred clover-shaped particulates are such that each "leaf" of the cross-section is defined by about a 270° arc of a circle having a diameter between about 0.02 and 0.05 inch. Other preferred particulates are those having quadralobal cross-sectional shapes, including asymmetrical shapes, and symmetrical shapes such as in FIG. 10 of U.S. Pat. No. 4,028,227. Other particulates are available from Davison Chemical Company, a division of W. R. Grace & Company, having ring and minilith shapes, as disclosed in U.S. Pat. No. 4,510,261.

The amounts of active components retained on the support particles during impregnation will depend largely on physical characteristics of the support particles, inter alia, surface area, pore volume and pore size distribution. Broadly speaking, the support particles have a surface area of about 10 to about 400 m$^2$/gram to about 400m$^2$/gram, and preferably about 125 m$^2$/gram to about 400 m$^2$/gram (as measured by the B.E.T. method). The total pore volume of the amorphous support, as measured by conventional mercury porosimeter methods, is usually about 0.2 to about 2.0 cc/gram, preferably about 0.25 to about to about 1.0 cc/gram, and most preferably about 0.3 to about 0.9 cc/gram. The amorphous support particles may have essentially any pore size distribution over a range of pore diameters as small as about 25 angstroms to as large as about 10,000 angstroms. Selection of a particular pore size distribution of the support particles depends in large part on the particular hydroprocessing reaction that is to be promoted by the final catalyst. For example, if demetallization of a residuum oil is desired, the support particles are selected with a pore size distribution such that the final catalyst has at least about 5 percent of the pore volume in pores having a diameter greater than 100 angstroms and preferably an average pore diameter from about 50 to about 250 angstroms. On the other hand, a pore size distribution of support particles utilized to produce a final catalyst effective for desulfurization or denitrogenation of gas oils should include pore sizes such that the final catalyst has at least about 50 percent of the pore volume in pores having a diameter from about 50 to about 150 angstroms. Physical characteristics of three preferred amorphous refractory oxide supports utilized in preparation of catalysts of the invention are summarized in Table A as follows:

TABLE A

| Pore Diameter Angstroms | Support X % Pore Volume | Support Y % Pore Volume | Support Z % Pore Volume |
|---|---|---|---|
| 40-50 | — | — | 4.0 |
| <50 | 0.8 | — | — |
| 50-60 | 5.7 | 4.0 | 16.0 |
| 60-70 | 16.4 | 15.0 | 46.0 |
| 70-80 | 29.9 | 61.0 | 28.0 |
| >80 | — | — | 6.0 |
| 80-90 | 24.6 | 13.0 | — |
| >90 | — | 7.0 | — |
| 90-100 | 9.8 | — | — |
| 100-110 | 6.6 | — | — |
| 110-120 | 1.6 | — | — |
| 120-130 | 0.8 | — | — |
| >130 | 5.7 | — | — |
| PORE VOLUME cc/gram (Merc. Poros.) | 0.61 | 0.63 | 0.58 |
| MODE PORE DIAMETER, Å (Merc. Poros.) | 88 | 76 | 67 |
| SURFACE AREA m²/gram (B.E.T. method) | 250 | 290 | 300 |

After impregnation, the support is dried and calcined to produce a catalyst containing the active components in desired proportions. The impregnated support particles may be dried and then calcined at a temperature of at least 750° F., and preferably from about 700° F. to about 1,400° F., so as to convert the active metals to their oxide forms. However, impregnated support particles containing a significant portion of nickel are calcined at a temperature preferably less than about 1,000° F., although support particles containing significant amounts of cobalt may preferably be calcined up to about 1,400° F. Furthermore, when calcining support particles impregnated with a solution of the invention containing a Group VIII metallic nitrate, flowing air is usually passed at a sufficient rate over the support particles to remove both the nitrogen oxide (NO and $NO_2$) and carbon dioxide ($CO_2$) produced by the exothermic reactions associated with nitrate and citric acid component decomposition.

Calcination of the impregnated support particles results in a substantial portion of the citric acid being removed by decomposition. However, trace amounts of carbon may remain after calcination and generally the final composition contains less than 0.5, preferably less than 0.1, and most preferably 0 weight percent carbon, calculated as C.

Another unusual feature of the invention is that, after calcination of the impregnated support particles, no crystalline deposits or crystalline aggregations resulting in a lessening in activity or stability of the final catalyst have been detected. Greater active component uniformity in the catalytic particles typically improves activity. The formation of a more evenly distributed layer of the active components, such as the metals and their oxides, or sulfides, in sufficient concentration throughout the surface area of the catalytic support ordinarily provides more provides more efficient utilization of the catalytic contacting surface. Better dispersed forms of active components onto the support particles from the impregnating solution containing both citric acid and phosphorus are believed responsible at least in part for the improved activity of the catalysts of the invention as compared to conventional catalysts. Impregnation of support particles with the solution of the invention reduces the segregation of catalytic components into inactive crystalline species o the support.

The final composition of the catalyst of the invention contains a Group VIB metal component and a phosphorus component and, optionally, a Group VIII metal component on the support particles. The physical characteristics of the final catalyst composition will usually vary from those of the support particles by less than about 25 percent. The final composition generally contains at least about 3 and preferably between about 5 and about 50 weight percent Group VIB metal components, calculated as the trioxides, and at least about 0.5 and preferably between 0.5 and 5 weight percent of phosphorus components, calculated as P. If present, the finished catalyst contains from about 0.5 to about 10 weight percent, and usually about 2 to about 6 weight percent, of Group VIII metal components, calculated as the monoxide. A highly preferred catalyst useful herein contains about 17 to about 27 weight percent of Group VIB metal components, calculated as the trioxide, from about 0.5 to about 5 weight percent of Group VIII metal components, calculated as the monoxide, and about 1 to about 4 weight percent of phosphorus components, calculated as P.

It is also preferred, for desulfurization or denitrogenation purposes, that the final catalyst composition contain greater than 10 weight percent, and most preferably between about 17 and about 30 weight percent of Group VIB metal components, preferably about 1 to about 4 weight percent of phosphorus components and preferably less than about 6 weight percent, and most preferably between about 1 and about 5 weight percent Group VIII metal components. For example, a catalyst composition comprises about 17 to about 30 weight percent of molybdenum components, about 0.5 to about 5 weight percent of phosphorus components and from about 1 to about 6 weight percent of nickel or cobalt components, and has a surface area of about 100 to about 400 m²/gram, a pore volume of about 0.15 to about 1.2 cc/gram, and a pore size distribution including at least 50 percent of the total pore volume in pores of diameter between about 50 and about 150 angstroms.

In another preferred embodiment in which the catalyst is utilized to promote demetallization reactions in a residuum feedstock, the final composition contains about 3 to about 17 weight percent of Group VIB metal components, calculated as $MoO_3$, up to about 5 weight percent of Group VIII metal components, calculated as the monoxide, and up to about 4 weight percent of phosphorus components, calculated as P. The impregnating solution utilized to prepare such a catalyst typically has a mole ratio of citric acid to $MoO_3$ greater than 0.5 to 1 and usually in the range from about 0.5 to 1 to about 1 to 1. For example, the catalyst contains about 3 to about 17 weight percent of molybdenum components, up to about 4 weight percent of phosphorus components and up to about 3 weight percent of cobalt or nickel components, and has a surface area of about 25 to about 300 m²gram, a pore volume of about 0.4 to about 1.5 cc/gram, and a pore size distribution including at least 5 percent of the total pore volume in pores of diameter greater than 100 angstroms. A highly preferred catalyst has a mode pore diameter from about 135 to about 165 angstroms.

Ordinarily, a preferred hydroprocessing catalyst is prepared from supports such as those disclosed herein in Table A so as to have a narrow pore size distribution wherein at least about 75 percent, preferably at least about 80 percent, and most preferably at least about 85 percent of the total pore volume is in pores of diameter from about 50 to about 130 angstroms. Ordinarily the catalyst (such as a catalyst prepared from Support X in Table A) has less than about 10 percent of the total pore volume in pores of diameter below about 50 angstroms and preferably less than about 10 percent or 0.05 cc/gram of the pore volume in pores of diameter greater than about 130 angstroms. The final catalyst preferably has less than about 0.05 cc/gram or less than about 10 percent of the total pore volume in pores of diameter greater than about 110 angstroms (such as a catalyst prepared from Supports Y or Z in Table A).

Another porosity feature of a preferred catalyst of the invention is the narrow pore size distribution of the pores of diameter greater than the mode pore diameter. (The mode pore diameter, as referred to herein, is the pore diameter represented on a pore size distribution curve of a catalyst or support at which the derivative of the total pore volume plotted on the ordinate vs. the pore diameter plotted on the abscissa is a maximum.) The mode pore diameter of the catalyst usually lies in the range from about 50 to 115 angstroms, preferably 55 to about 100 angtroms, and most preferably about 60 to about 90 angstroms. Ordinarily, at least about 40 percent of the total pore volume is in pores of diameter between the mode pore diameter and less than about 90 angstroms, preferably less than about 50 angstroms, and most preferably less than about 25 angstroms above the mode pore diameter. With respect to small pores, at least about 40 percent of the total pore volume is in pores of diameter between the mode pore diameter and less than about 50, and preferably less than about 25 angstroms below the mode pore diameter.

One highly preferred catalyst employed in the invention contains about 1 to about 6 weight percent of Group VIII metal components, calculated as the monoxide, from about 17 to about 35 weight percent of Group VIB metal components, calculated as the trioxide, and about 1 to about 6 weight percent of phosphorus components, calculated as P, on a porous refractory oxide support consisting essentially of gamma alumina (such as Support X in Table A). The most preferred Group VIII and Group VIB metals in this embodiment are cobalt and molybdenum, respectively. Physical characteristics of this catalyst include a total pore volume of about 0.30 to about 0.50 cc/gram, a surface area from about 125 to about 225 m$^2$/gram and a mode pore diameter from about 80 to about 110 angstroms.

Another highly preferred catalyst prepared from supports such as Y and Z in Table A contains about 1 to about 6 weight percent of nickel component, calculated as NiO, from about 17 to about 30 weight percent of molybdenum components, calculated as MoO$_3$, and about 1 to about 6 weight percent of phosphorus components, calculated as P, on a support containing gamma alumina. This catalyst has a surface area from about 125 m$^2$/gram to about 250 m$^2$/gram, a mode pore diameter from about 60 to about 90 angstroms, and preferably about 70 to about 85 angstroms, and a pore size distribution wherein less than 10 percent of the pore volume is in pores of diameter greater than 110 angstroms. It is also preferred that this catalyst contain at least about 70 percent of the pore volume in pores of diameter in the range from about 20 angstroms above and about 20 angstroms below the mode pore diameter. As shown hereinafter in Example I, a highly preferred catalyst embodiment contains less than 25 and preferably about 22 to about 24.5 weight percent of molybdenum components, less than 4.5 and preferably about 2 to about 3.8 weight percent of nickel components and less than 3 and preferably about 1.5 to about 2.8 weight percent of phosphorus components, calculated as P.

After calcination, the final catalyst is generally activated by conventional means for its intended use in a given hydroprocess of a hydrocarbon oil. The catalyst may, for example, be activated by reduction of the active components to the free metal form, employed in the calcined oxide form or conversion of the oxide form to the sulfide form. When employed with active components in the sulfide form, the catalyst may be presulfided so as to convert the active metal components to the corresponding sulfides. Usually the catalysts are presulfided prior to use by contact with a stream of sulfiding gas, such as hydrogen sulfide-hydrogen mixtures containing about 1 to 10 volume percent of hydrogen sulfide, at temperatures between about 200° F. and 1,200° F. Although presulfiding of the catalyst is preferred, it is not essential, as the catalyst may be sulfided "in situ" in a short time by contact with a sulfur-containing feedstock processed under hydroprocessing conditions.

The catalyst of this invention may be employed in any of several processes for hydroprocessing hydrocarboncontaining oils wherein catalytic composites containing Group VIB metals and phosphorus components, or Group VIB and Group VIII metals and phosphorus components are known to be catalytically effective, such as hydrogenation, dehydrogenation, hydrodesulfurization, oxidation, hydrodenitrogenation, hydrodemetallization, hydroisomerization, hydrocracking, mild hydrocracking, hydroreforming, and the like. Contemplated for treatment by the process of the invention are relatively high boiling hydrocarbon-containing oils including crude petroleum oils and synthetic crudes. Among the typical oils contemplated are top crudes, vacuum and atmospheric residual fractions, light and heavy atmospheric and vacuum distillate oils, deasphalted oils, shale oils, and oils from bituminous sands, coal compositions and the like. For use herein, typical hydrocarbon oils, or mixtures thereof, may contain at least about 10 volume percent of components normally boiling above about 1000° F. and in some cases, at least 20 volume percent. Other hydrocarbon oils include lubricating oils, waxes, kerosene, solvent naphthas, fuel oils, diesel fuels, jet fuels, heavy naphthas, light naphthas, cycle oils from cracking operations, coker distillates, cracked gasoline, decant oils, and the like.

Generally, a substantial proportion (i.e., at least about 90 volume percent) of hydrocarbon feeds such as gas oils and the like boil at a temperature less than about 1100° F., preferably less than about 1050° F., and usually boil entirely within the range of about 100° F. to about 1100° F., and most frequently in the range from about 400° F. to about 1100° F.

Although virtually any high boiling hydrocarbon feedstock may be treated by hydroprocessing with the catalyst of the invention, the process is particularly suited to treating (1) gas oils, preferably light and heavy vacuum gas oils and waxy shale oils, and (2) heavy residual fractions, especially the treated atmospheric and vacuum residuum oils containing less than about 25 ppmw, preferably less than 5 ppmw and most preferably less than 3 ppmw of contaminant metals (vanadium, nickel, and the like). Sulfur is usually present in such oils in a proportion exceeding 0.1 weight percent and often exceeding 1.0 weight percent; however, a particular preferred proportion is about 0.1 to about 0.5 weight percent. The feedstock contains undesirable proportions of nitrogen, usually in a concentration greater than about 2 ppmw and often between about 2 ppmw and 5000 ppmw. Ordinarily the feedstock contains less than 200 ppmw of nickel and vanadium contaminant metals, calculated as Ni plus V, with preferred feedstocks containing less than 20 ppmw and most preferably less than 5 ppmw of said materials. The feedstock may contain waxy components, e.g., n-paraffins and slightly-branched paraffins, and thus have a high pour point, e.g., at least about 30° F.

The catalyst may be employed as either a fixed, ebullating, slurried or fluidized bed (but most usually a fixed bed) of particulates in a suitable reactor vessel wherein the hydrocarbon oil to be treated is introduced and subjected to hydroprocessing conditions including an elevated total pressure, temperature, and hydrogen partial pressure. Under such conditions, the hydrocarbon oil and catalyst are subjected to a hydrogen partial pressure usually in the range from about 100 to about 4,000 p.s.i.g. at a space velocity usually in the range from about 0.05 to about 20 LHSV so as to effect the desired degree of hydroprocessing, as for example, demetallization, desulfurization and/or denitrogenation, i.e., so as to effect the desired degree of conversion of, for example, sulfur, nitrogen and metal-containing compounds to hydrogen sulfide, ammonia, and metal forms capable of being deposited in the catalyst, respectively. The catalyst of the invention is particularly effective for desulfurization, denitrogenation and demetallization reactions, especially when utilized to process hydrocarbon oils such as gas oils and residuum fractions.

In the hydroprocessing of a hydrocarbon oil, the catalyst is usually maintained in a hydroprocessing reactor as a fixed bed with the feedstock passing downwardly once therethrough. In some instances, one or more additional reactors may be added to the single reactor, either in series or parallel. If the feedstock is unusually high in organometallic compounds, it may be pretreated, integrally or separately, using a conventional hydrodemetallation catalyst or a hydrodemetallation catalyst of the invention and particularly, a hydrodemetallation catalyst having a substantial amount of pore volume in pores of diameter greater than that corresponding to the average pore volume of the catalyst of the invention.

Typical hydroprocessing conditions that are suitable for hydrodenitrogenation, hydrodesulfurization, or that yield more than about 10 volume percent conversion of the oil fraction boiling above 1000° F. to liquid products boiling at or below 1000° F. are shown in the following Table I:

TABLE I

| Operating Conditions | Suitable Range | Preferred Range |
|---|---|---|
| Temperature, °F. | 500–900 | 600–850 |
| Hydrogen Pressure, p.s.i.g. | 200–4,000 | 500–2,500 |
| Space Velocity, LHSV | 0.05–5.0 | 0.1–3.0 |
| Hydrogen Recycle Rate, scf/bbl | 500–15,000 | 1,000–10,000 |

Generally, the hydrogen partial pressure maintained during hydroprocessing is more than 50 percent of the total pressure. Usually, for once-though operation, the hydrogen partial pressure is between about 85 and 95 percent of the total pressure while, for recycle operation, the hydrogen partial pressure is somewhat lower, i.e., between 80 and 85 percent of the total pressure.

The hydroprocess of the invention may include either serial or simultaneous desulfurization and denitrogenation of a feedstock. Simultaneous desulfurization, denitrogenation and heavy component (1000° F. plus components) conversion, as used herein, involves contacting a hydrocarbon oil feedstock with the particulate catalyst disclosed herein under conditions effecting (1) a lower sulfur and nitrogen content in the effluent and (2) a higher percentage of liquid products boiling at or below 1000° F. in the effluent as compared to the feedstock. Serial desulfurization and denitrogenation of a feedstock by contact with the catalyst of the invention involves removing sulfur and nitrogen from the feedstock either prior to or after contact of the feedstock with a catalyst effective for removing a substantial proportion of contaminant metals from the feed.

A preferred embodiment utilizing the catalyst of the invention comprises a combined hydrodemetallation, hydrodesulfurization and hydrodenitrogenation reaction zone wherein the catalyst of the invention is located in a downstream portion of a fixed bed relative to an upstream catalyst bed portion containing a demetallization catalyst having an average pore diameter of at least 30 angstroms greater than that of the catalyst of the invention. In contrast to utilizing a comparable narrow pore sized catalyst prepared without citric acid in the impregnating solution, or more particularly without citric acid in a mole ratio to $MoO_3$ of less than 1 to 1, in the downstream location of the catalyst bed, the catalyst of the invention exhibits better activity and provides a surprisingly more stable process for removing nitrogen, sulfur and conversion of 1000° F. plus components to 1000° F. minus components in the oil.

The invention is further illustrated by the following examples which are illustrative of specific modes of practicing the invention and are not intended as limiting the scope of the invention as defined in the appended claims.

EXAMPLE I

A catalyst, Catalyst A, prepared in accordance with the invention is tested under typical hydrodesulfurization conditions against a reference catalyst, Catalyst X. Catalysts A and X have a 1/20 inch trilobal cross-sectional shape and have nominal compositions of 25.0 weight percent of molybdenum components, calculated as $MoO_3$, 4.0 weight percent of nickel components, calculated at NiO, 3.0 weight percent of phosphorus, calculated as P, and the balance of gamma alumina. Catalyst A of the invention is prepared as follows:

An impregnating solution of the invention is prepared by placing 47 grams of ammonium heptamolybdate (AHM) in a beaker containing 47 ml of water and partially dissolving AHM by stirring for one minute. Undissolved AHM is dissolved by stirring into the resulting solution about 17 grams of 85 percent phosphoric acid ($H_3PO_4$). After dissolution of the AHM, 14 grams of citric acid (monohydrate) is dissolved in the resulting solution to provide a mole ratio of 0.2 to 1, citric acid (calculated as the monohydrate) to AHM (calculated as $MoO_3$). Nickel nitrate ($Ni(NO_3)_2 \cdot 6H_2O$) in the amount of 24 grams is then dissolved in the resulting solution. After dissolution of the nickel nitrate, an impregnating solution having a volume of 70 ml and a pH of about 0.3 is obtained. This solution is stable and may be stored for two weeks or longer prior to impregnation.

Gamma alumina support particles (100 grams), having a pore size distribution as shown in Table II, are then contacted with the impregnate solution. Substantially all 70 ml of the impregnate solution is taken up by the support.

The impregnated composition is allowed to stand (age) for two hours following which it is oven dried at 110° C. and then calcined at 900° F. for ½ hour in flowing air. The final catalyst has a pore size distribution as shown in Table II. Catalyst X is prepared in the same manner and from the same support as Catalyst A except no citric acid is added to the impregnating solution.

TABLE II

PORE SIZE DISTRIBUTIONS AND SURFACE AREAS

| Pore Diameter, Angstroms | Support % of total p.v. | Catalyst A % of total p.v. |
|---|---|---|
| <40 | 0.9 | 0.6 |
| 40–50 | 1.8 | 1.8 |
| 50–60 | 10.0 | 3.5 |
| 60–70 | 36.4 | 9.8 |
| 70–80 | 34.0 | 20.6 |
| 80–90 | 7.8 | 30.3 |
| 90–100 | 1.0 | 18.0 |
| 100–110 | 1.8 | 7.4 |
| >110 | 6.3 | 8.0 |
| TOTAL PORE VOLUME (Merc. Poros.) | 0.55 | 0.34 |
| SURFACE AREA m²/gram (B.E.T. method) | 300 | 175 |
| MODE PORE DIAMETER, Å (Merc. Poros.) | 68 | 82 |

The test is conducted by contacting the catalysts in separate runs with the feedstock identified in Table III under hydroprocessing conditions. However, at the outset of each run, the respective catalysts are presulfided by contact for about 16 to 20 hours with a gas consisting of 90 volume percent $H_2$ and 10 volume percent $H_2S$ flowing at 4.4 SCFM (one atmosphere pressure). The temperature during the presulfiding is initially at room temperature, is increased gradually until 700° F. is reached, and then lowered to 550° F., at which time the catalyst is contacted with the feedstock.

TABLE III

| Feedstock Properties | |
|---|---|
| Feed Description | Vacuum Gas Oil |
| Gravity, °API | 23.2 |
| Sulfur, wt. % | 1.8 |
| Total Nitrogen, wt. % | 0.312 |
| Basic Nitrogen, wt. % | 0.129 |
| Pour Point, °C. | −18 |
| ASTM D-1160, Vol. % | Distillation, °F. |
| IBP/5 | 185/520 |
| 10/20 | 542/577 |
| 30/40 | 605/633 |
| 50/60 | 667/691 |
| 70/80 | 719/742 |
| 90/95 | 771/796 |
| End Point | 817 |

A portion of the feedstock is passed downwardly through a reactor vessel and contacted in separate runs with Catalyst A and Catalyst X, in a single-stage, single-pass system with once-through hydrogen. The operating conditions during each run are summarized as follows: 1,400 p.s.i.g. total pressure, 2.0 LHSV, a hydrogen rate of 6,000 SCF/bbl, and an initial temperature of 720° F.

Giving Catalyst X employed at 60 hours in the reference hydroprocess an arbitrary activity of 100, relative activities of Catalyst A of the invention and Catalyst X for denitrogenation and desulfurization are determined by calculation and tabulated in comparison to Catalyst X in Table IV These denitrogenation activity determinations are based on a comparison of the reaction rates for denitrogenation obtained from the data of the experiment according to the following standard equation which assumes first order kinetics for denitrogenation:

$$\text{Relative Volume Denitrogenation Activity} = \frac{\ln [C_f/C_p]}{\ln [C_{fr}/C_{pr}]} \times 100$$

where $C_{fr}$ and $C_{pr}$ are the respective concentrations of nitrogen in the feed and product obtained with the catalyst employed in the reference process and $C_f$ and $C_p$ are the respective concentrations of nitrogen in the feed and product obtained with a catalyst being compared to the reference. These desulfurization activity determinations are based on a comparison of the reaction rates for desulfurization obtained from the data of the experiment according to the following standard equation which assumes one and one-half order kinetics for desulfurization:

$$\text{Relative Desulfurization Activity} = \frac{(1/S_p)^{\frac{1}{2}} - (1/S_f)^{\frac{1}{2}}}{(1/S_{pr})^{\frac{1}{2}} - (1/S_{fr})^{\frac{1}{2}}} \times 100$$

where $S_{fr}$ and $S_{pr}$ are the respective concentrations of sulfur in the feed and product obtained with the reference catalyst and $S_f$ and $S_p$ are the respective concentrations of sulfur in the feed and product obtained with a catalyst being compared to the reference.

The relative volume activity (RVA) for total nitrogen and sulfur conversion obtained for each catalyst is set forth in Table IV. The data in Table IV indicate that Catalyst A prepared from an impregnate solution containing citric acid in a mole ratio to $MoO_3$ of less than 1 to 1, is consistently more active (i.e., at least about 10 percent) than essentially the same catalyst prepared without citric acid in the impregnate solution.

TABLE IV

| Catalyst | RVA for basic nit., $N_{(b)}$ | for total nit., $N_{(t)}$ | for sulfur, S |
|---|---|---|---|
| A | 112 | 115 | 115 |
| X | 100 | 100 | 100 |

EXAMPLE II

Catalyst X of Example I and another catalyst of the invention, Catalyst B, are tested in separate runs for hydroprocessing the feedstock of Example I under the same conditions as Example I.

Catalyst B is prepared in the same manner as Catalyst A in Example I, except the AHM and phosphoric acid amounts are reduced. The citric acid (12 grams) is added in an amount providing a mole ratio of citric acid to MoO$_3$ of 0.2 to 1. The pH of the resulting impregnating solutions is 0.35.

The dried and calcined finished catalyst has a nominal composition as set forth in Table V.

TABLE V

| Catalyst | MoO$_3$ | NiO | P | N$_{(b)}$ | N$_{(t)}$ | S |
|---|---|---|---|---|---|---|
| X | 25.0 | 4.0 | 3.0 | 100 | 100 | 100 |
| B | 23.9 | 3.5 | 2.6 | 124 | 123 | 133 |

The data in Table V indicate that Catalyst B, containing less phosphorus and molybdenum components than Catalyst X (or Catalyst A in Example 1), is also more active for denitrogenation and desulfurization than Catalyst X (or Catalyst A in Example I).

While particular embodiments of the invention have been described, it will be understood, of course, that the invention is not limited thereto since many obvious modifications can be made, and it is intended to include within this invention any such modifications as will fall within the scope of the invention as defined by the appended claims.

We claim:

1. A catalytic composition prepared by the method comprising the steps of (1) impregnating porous refractory support particles with an aqueous impregnating solution comprising (a) one or more Group VIB metal components, (b) one or more phosphorus components and (c) citric acid, said citric acid in a mole ratio to said Group VIB metal components calculated as the Group VIB metal trioxide of less than 1 to 1, said solution having a pH less than 1.0 and (2) calcining the impregnated support particles to produce a catalytic composition containing a Group VIB metal component and a phosphorus component on said porous refractory oxide support.

2. The composition defined in claim 1 wherein said impregnating solution further comprises one or more Group VIII metal components.

3. The composition defined in claim 1 wherein said impregnating solution has a pH from 0 to 1.0.

4. The composition defined in claim 1 wherein said impregnating solution contains at least about 3 weight percent of said Group VIB metal components, calculated as the trioxide.

5. The composition defined in claim 1 wherein said impregnating solution contains at least about 1.0 weight percent of said phosphorus components, calculated as P.

6. The composition defined in claim 2 wherein said impregnating solution contains at least about 0.5 weight percent of said Group VIII metal components, calculated as the monoxide.

7. The composition defined in claim 1 wherein said mole ratio is in the range from about 0.05 to 1 to about 0.9 to 1.

8. The composition defined in claim 1 comprising a weight percent of said phosphorus components, calculated as P, that is at least 10 percent of the weight percent of said Group VIB metal components, calculated as the trioxide.

9. The composition defined in claim 2 comprising at least about 17 weight percent of molybdenum components, calculated as MoO$_3$, at least about 1.0 weight percent of phosphorus components, calculated as P, and at least about 0.5 weight percent of nickel components, calculated as NiO.

10. The composition defined in claim 9 comprising at least 75 percent of the total pore volume in pores of diameter from about 50 to about 130 angstroms.

11. The composition defined in claim 9 comprising at least 75 percent of its pore volume in pores of diameter from about 50 to about 110 angstroms and less than about 10 percent of the total pore volume in pores of diameter greater than 110 angstroms.

12. The composition defined in claim 12 comprising about 22 t about 24.5 weight percent of molybdenum 13. An aqueous impregnating solution for preparing a catalyst composition comprising one or more dissolved Group VIB metal components, one or more phosphorus components and citric acid, said citric acid in a mole ratio to said Group VIB metal components, calculated as the Group VIB metal trioxide, of less than 1 to 1, and said solution having a pH less than 1.0.

14. The solution defined in claim 13 further comprising one or more Group VIII metal components.

15. The solution defined in claim 13 having a pH from 0 to 1.0.

16. The solution defined in claim 13 containing at least about 3 weight percent of said Group VIB metal components.

17. The solution defined in claim 13 containing at least about 17 weight percent of said Group VIB metal components.

18. The solution defined in claim 13 containing at least about 1.0 weight percent of said phosphorus components.

19. The solution defined in claim 14 containing at least about 0.5 weight of said Group VIII metal components.

20. The solution defined in claim 14 wherein said mole ratio is in the range from about 0.05 to 1 to about 0.9 to 1.

21. The solution defined in claim 13 wherein said mole ratio is in the range from about 0.1 to 1 to about 0.5 to 1.

22. The solution defined in claim 13 wherein said Group VIB metal component comprise molybdenum.

23. The solution defined in claim 14 wherein said Group VIII metal components comprise cobalt or nickel.

24. The solution defined in claim 13 wherein said phosphorus component comprise phosphoric acid.

25. The solution defined in claim 1 wherein said phosphorus components, calculated as P, comprise at least 10 percent of the weight percent of said Group VIB metal components, calculated as the trioxide.

26. The solution defined in claim 13 comprising sufficient concentrations of said Group VIB metal components, of said phosphorus components, and of said citric acid to provide a final catalytic composition comprising at least about 3 weight percent of said Group VI metal components and at least about 0.3 weight percent of said phosphorus components.

27. The solution defined in claim 13 comprising sufficient concentrations of said Group VIB metal components, of said phosphorus components, of said Group VIII metal components, and of said citric acid to provide a final catalytic composition comprising at least about 3 weight percent of said Group VIB metal components, at least 0.5 weight percent of said Group VIII metal components and at least about 0.3 weight percent of said phosphorus components.

28. A catalytic composition containing about 22 to about 24.5 weight percent of Group VIB metal components, calculated as the trioxide, about 2 to about 4.5 weight percent of Group VIII metal components, calculated as the monoxide, and about 1.5 to about 2.8 weight percent of phosphorus components, calculated as P, prepared by the method comprising the steps of (1) impregnating porous refractory support particles with the aqueous impregnating solution of claim 13, and (2) calcining the impregnated support particles.

29. A catalytic composition prepared by the method comprising the steps of (1) impregnating porous refractory support particles with the aqueous impregnating solution of claim 20, and (2) calcining the impregnated support particles.

30. A catalytic composition prepared by the method comprising the steps of (1) impregnating porous refractory support particles with the aqueous impregnating solution of claim 26, and (2) calcining the impregnated support particles.

31. A catalyst composition containing about 17 to about 27 weight percent of Group VIB metal components, about 1.0 to about 4.0 weight percent of phosphorus components, and about 0.5 to about 5.0 weight percent of Group VIII metal components, prepared by the method comprising the steps of (1) impregnating porous refractory support particles with the aqueous impregnating solution of claim 27, and (2) calcining the impregnated support particles.

32. The composition defined in claim 31 having a pore size distribution wherein at least 75 percent of the total pore volume is in pores of diameter from about 50 to about 130 angstroms and has a mode pore diameter from about 55 to about 100 angstroms.

33. The composition defined in claim 32 having less than 10 percent of the total pore volume in pores of diameter greater than 110 angstroms.

34. An impregnating solution for preparing a catalyst composition one or more Group VIB metal components, greater than 0.5 weight percent of one or more phosphorus components and citric acid, said citric acid in a mole ratio to said Group VIB metal components, calculated as the trioxide, in the range from greater than 0.5 to 0.9 to 1 and said solution having a pH less than 1.0.

35. The solution defined in claim 34 further comprising one or more Group VIII metal components.

36. The solution defined in claim 35 having a pH from 0 to 1.0.

37. The solution defined in claim 36 comprising molybdenum components and cobalt or nickel components.

38. A catalyst composition prepared by a method employing the impregnating solution of claim 37.

39. The composition defined in claim 38 containing about 3 to about 17 weight percent of molybdenum components, calculated as $MoO_3$, about 0.05 to about 4.0 weight percent of nickel or cobalt components, calculated as the monoxide, and has a pore size distribution including at least about 5 percent of the total pore volume in pores of diameter greater than 100 angstroms.

40. The composition defined in claim 39 having mode pore diameter from about 135 to about 165 angstroms.

41. A method for preparing a catalyst composition comprising:
(1) preparing an aqueous impregnating solution by the following sequential steps (a) at least partially dissolving one or more Group VIB metal components in water (b) dissolving a compound of phosphorus and (c) dissolving citric acid in a mole ratio to said Group VIB metal components, calculated as the trioxide, of less than 1 to 1, said solution having a pH less than 1.0,
(2) impregnating porous refractory support particles with the solution of step (1), and
(3) calcining the impregnated support particles of step (2) to produce a catalytic composition containing a Group VIB metal component and a phosphorus component on said porous refractory oxide.

42. The method defined in claim 41 further comprising a step (d) wherein a Group VIII metal components is dissolved in said solution.

43. The method defined in claim 42 wherein said Group VIB metal components comprise molybdenum trioxide or ammonium heptamolybdate, said compound of phosphorus comprises phosphoric acid and said Group VIII metal components comprise cobalt nitrate or nickel nitrate.

44. The method in claim 41 wherein said mole ratio is in the range from about 0.05 to 1 to about 0.9 to 1.

* * * * *

UNITED STATES PATENT AND TRADEMARK OFFICE
CERTIFICATE OF CORRECTION

PATENT NO. : 4,879,265

DATED : November 7, 1989

INVENTOR(S) : Howard D. Simpson and Pauline B. Borgens

It is certified that error appears in the above-identified patent and that said Letters Patent is hereby corrected as shown below:

Claim 12, column 16, line 2, after "22" the "t" should read --to--, and after "molybdenum" insert --components, calculated as MoO3, about 0.5 to less than 3 weight percent of phosphorus components, calculated as P, and 0.5 to less than 4.5 weight percent of nickel components, calculated as NiO--.

Claim 25, column 16, line 46, "component" should read --components--.

Claim 25, column 16, line 47, "1" should read --13--.

Claim 26, column 16, line 55, "VI" should read --VIB--.

Claim 34, column 17, line 45, after "0.5" insert --to 1--.

Claim 40, column 18, line 17, after "having" insert --a--.

Signed and Sealed this

Nineteenth Day of February, 1991

*Attest:*

HARRY F. MANBECK, JR.

*Attesting Officer*  *Commissioner of Patents and Trademarks*